(Model.)
C. DAVIS & N. REDMOND.
WHIFFLETREE.
No. 360,664. Patented Apr. 5, 1887.
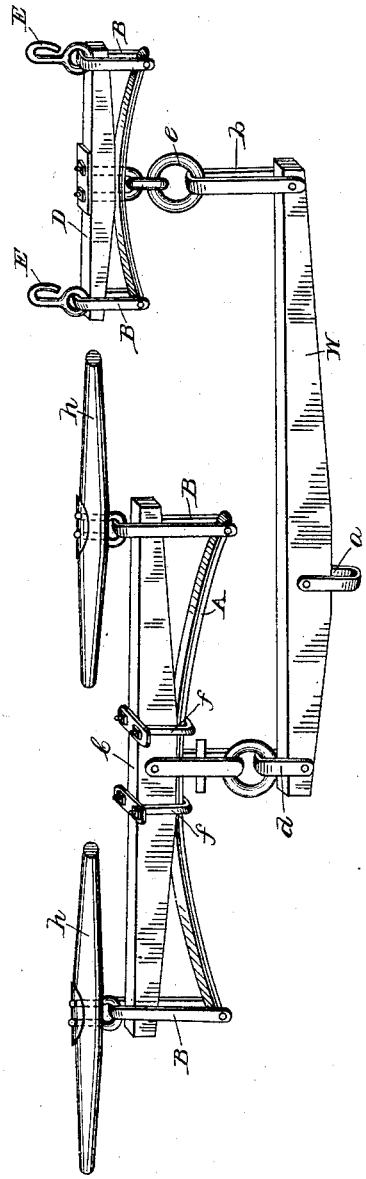
Witnesses
Howard J. Schneider
James J. Sheehy
Inventors
Chas Davis, N Redmond
By their Attorney
Frank Sheehy

UNITED STATES PATENT OFFICE.

CHARLES DAVIS AND NEWTON REDMOND, OF EAST SAGINAW, MICHIGAN.

WHIFFLETREE.

SPECIFICATION forming part of Letters Patent No. 360,664, dated April 5, 1887.

Application filed October 5, 1885. Serial No. 179,066. (Model.)

*To all whom it may concern:*

Be it known that we, CHARLES DAVIS and NEWTON REDMOND, citizens of the United States, residing at Saginaw city, in the county of Saginaw and State of Michigan, have invented certain new and useful Improvements in Whiffletrees, of which the following is a full, clear, and exact description of the invention, such as will enable others skilled in the art to make and use the same.

This invention relates to improvements in draft-equalizers; and it consists in the construction, novel arrangement, and adaptation of devices, as will be hereinafter more fully set forth and claimed.

The object of this invention is to improve that class of equalizers in which springs are employed to remove strain upon animals consequent to sudden obstructions of a vehicle, plow, or the like during travel, thereby easing the draft and preventing the galling of the animal's shoulders.

This invention is illustrated in the accompanying drawing by a perspective view.

Referring by letter to the said drawing, W indicates the main whiffletree, which is provided with a loop on its rear side, as at $a$, for attachment to a plow or the like. At one end of this whiffletree is pivoted a forward loop, $b$, and at the opposite end is pivoted a similar but shorter loop, $d$, both of which carry rings $e$, for the attachment of the double and single trees.

C indicates the double-tree, and A a curved spring, which engages by its convex side the rear side of the said double-tree, and is secured thereto by the clips $f f$. From the outer ends of these springs are secured links B B, through which the opposite ends of the double-tree pass and connect the single-trees $h h$ with the said spring A. Thus it will be seen that there is a spring or yielding connection between the draft-animals and the plow or vehicle, thereby preventing any sudden and harsh jar or strain upon the former. The whiffletree D is also provided with a spring, A, and has its draft or attaching loops E E connected with the said spring by means of the links B B, the hooks extending from the forward closed ends of the links. The double-tree is connected with the link $d$ of the whiffletree by means of the intermediate nuts and ring, as shown.

Having described this invention, what we claim is—

The improved draft-equalizer herein described, consisting, essentially, of the main whiffletree W, the short link $d$ and the long link $b$ at opposite ends thereof, carrying rings, as shown, the link F, connecting the double-tree with the ring of the said short link, the longitudinally-curved springs clipped to the rear middle portion of the double-tree and small whiffletree, the links B, passing around the ends of the said double and whiffle tree and connecting the ends of the springs with the single-trees and draft-hooks, substantially as specified.

CHARLES DAVIS.
NEWTON ✕ REDMOND.
his  mark

Witnesses:
W. T. ATWOOD,
R. N. WILSON.